United States Patent
Boggs et al.

(10) Patent No.: US 6,457,119 B1
(45) Date of Patent: Sep. 24, 2002

(54) PROCESSOR INSTRUCTION PIPELINE WITH ERROR DETECTION SCHEME

(75) Inventors: Darrell Boggs, Aloha, OR (US); Robert F. Krick, Fort Collins, CO (US); Chan Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/360,192

(22) Filed: Jul. 23, 1999

(51) Int. Cl.[7] ............................................... G06F 9/38
(52) U.S. Cl. ...................................... 712/227; 712/231
(58) Field of Search ................................. 712/227, 231

(56) References Cited

U.S. PATENT DOCUMENTS

| | | | | |
|---|---|---|---|---|
| 5,150,469 A | * | 9/1992 | Jouppi .......................... | 712/244 |
| 5,269,017 A | * | 12/1993 | Hayden ......................... | 714/15 |
| 5,446,849 A | * | 8/1995 | Minagawa et al. .......... | 712/233 |
| 5,629,950 A | * | 5/1997 | Godiwala .................... | 714/805 |
| 5,740,391 A | * | 4/1998 | Hunt ............................ | 712/200 |
| 5,799,165 A | * | 8/1998 | Favor et al. ................. | 712/214 |
| 5,867,699 A | * | 2/1999 | Kuslak ......................... | 712/240 |
| 5,870,601 A | * | 2/1999 | Getzlaff et al. ............. | 712/226 |
| 5,881,078 A | * | 3/1999 | Hanawa ....................... | 714/823 |
| 5,961,655 A | * | 10/1999 | Johnson ...................... | 714/48 |
| 6,055,630 A | * | 4/2000 | D'Sa ............................ | 712/240 |
| 6,079,014 A | * | 6/2000 | Papworth .................... | 712/233 |

OTHER PUBLICATIONS

U.S. patent application Ser. No. 08/956,375, Krick et al., filed Oct. 23, 1997.
Eric Rotenberg, Steve Bennett, James E. Smith, "Trace Cache: a Low Latency Approach to High Bandwidth Instruction Fetching", Published in the Proceedings of the 29th Annual International Symposium on Microarchitecture, Dec. 2–4, 1996, IEEE, 12 pages.

* cited by examiner

*Primary Examiner*—Eric Coleman
(74) *Attorney, Agent, or Firm*—Howard A. Skaist

(57) ABSTRACT

Briefly, in accordance with one embodiment of the invention, a processor includes: a multiple unit instruction pipeline. An instruction pipeline includes a microcode source. The microcode source includes the capability of detecting the occurrence of at least one corrupted microcode instruction. The microcode source is also capable of signaling the occurrence of at least one corrupted microcode instruction to at least one other instruction pipeline unit. Briefly, in accordance with another embodiment of the invention, a method of executing microcode instructions includes the following. The existence of at least one corrupted microcode instruction is detected and the occurrence of at least one corrupted microcode instruction is signaled. Briefly, in accordance with one more embodiment of the invention, a system includes: a processor with a microcode source capable of detecting the occurrence of at least one corrupted microcode instruction and signaling the occurrence of at least one corrupted microcode instruction to at least one other instruction pipeline unit. The system employing the processor further includes main memory, a video card, a system bus, and bulk storage capability.

28 Claims, 5 Drawing Sheets

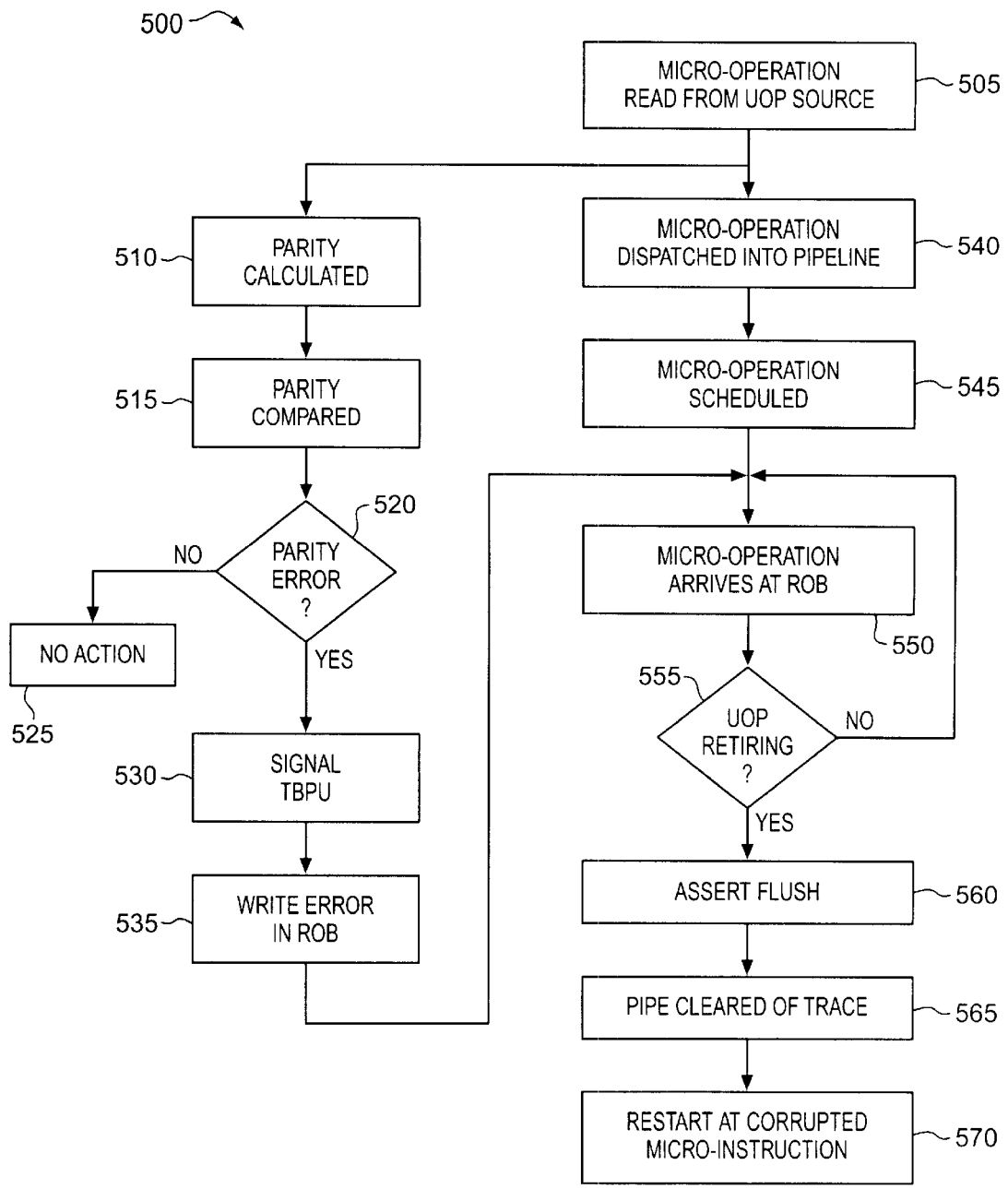

PROCESSOR INSTRUCTION PIPELINE WITH ERROR DETECTION SCHEME

BACKGROUND

1. Field

This disclosure relates to a processor instruction pipeline. More particularly, a pipeline for processing microcode or machine-readable instructions with an error-detection scheme.

2. Background Information

As is well-known, digital electronic circuitry may experience soft errors. Soft errors are typically the result of external random events, such as radiation. These external random events may cause a digital logic value to switch from its intended value, e.g. from logic '1' to logic '0'. As is also well-known, soft errors are transient in nature. More particularly, after the effects of a soft error are corrected, digital electronic components will typically function as expected.

The occurrence of a soft error in a processor instruction pipeline may corrupt one or more microcode or machine readable instructions by resulting in the switching of logic levels in one or more instructions to an opposite state from the intended state. Microcode or machine readable instructions are executed by a processor in carrying out its intended operations. Corrupted microcode or machine readable instructions, in turn, may result in a system in which a processor is employed halting or behaving in an undesired manner. A need, therefore, exists for a scheme to handle the occurrence of corrupted microcode or machine readable instructions in a processor instruction pipeline that reduces the effects of these corrupted instructions on processor operation.

SUMMARY

Briefly, in accordance with one embodiment of the invention, a processor includes: a multiple unit instruction pipeline. An instruction pipeline includes a microcode source. The microcode source includes the capability of detecting the occurrence of at least one corrupted microcode instruction. The microcode source is also capable of signaling the occurrence of at least one corrupted microcode instruction to at least one other instruction pipeline unit.

Briefly, in accordance with another embodiment of the invention, a method of executing microcode instructions includes the following. The existence of at least one corrupted microcode instruction is detected and the occurrence of at least one corrupted microcode instruction is signaled.

Briefly, in accordance with one more embodiment of the invention, a system includes: a processor with a microcode source capable of detecting the occurrence of at least one corrupted microcode instruction and signaling the occurrence of at least one corrupted microcode instruction to at least one other instruction pipeline unit. The system employing the processor further includes main memory, a video card, a system bus, and bulk storage capability.

BRIEF DESCRIPTION OF THE DRAWINGS

The subject matter regarded as the invention is particularly pointed out and distinctly claimed in the concluding portions of the specification. The invention, however, both as to organization and method of operation, together with objects, features and advantages thereof, may be best understood by reference to the following description when read with the accompanying drawings in which:

FIG. 5 is a flowchart illustrating one embodiment of a method of executing microcode instructions in accordance with the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and circuits have not been described in detail so as not to obscure the present invention.

As previously discussed, corrupted processor microcode instructions, such as corrupted micro-operations (uops) in certain embodiments, may result in undesired effects upon the operation of a processor. A processor is typically one part of a digital electronic system that operates on data and executes instructions, such as uops. In certain embodiments in accordance with the invention, a processor may comprise a microprocessor (uprocessor). Additionally, in this context, a uop comprise one example of a type of microcode instruction. One possible alternative embodiment comprises a processor that executes decoded reduced instruction set computer (RISC) instructions, another type of microcode instruction, instead of uops. Of course, the foregoing does not limit the scope of the invention in any respect.

One example of an undesired effect that may result from the occurrence of a corrupted microcode instruction in a processor instruction pipeline, such as, for example, a micro-operation (uop), in this particular embodiment, comprises an unexpected stall of the system in which the affected processor is employed. For example, corrupted uops may result in unexpected stalls if the corruption results in a uop pattern that is not defined. Attempting to execute an undefined uop pattern may result in a condition that is undefined for the processor. This undefined condition may in turn result in the processor halting or hanging, as it is sometimes referred to. Typically, the system is restarted after an unexpected halt. However, restarting a system may result in data being lost and is also inefficient.

Another example of an effect of corrupted uops that also is typically undesirable is that some situations may produce no immediately observable system level effects. Therefore, this may result in an unwanted operation occurring or incorrect information being used in processing uops. With no immediately observable system level effects, undesired occurrences may not be immediately apparent to the system user; however, undesired downstream consequences may nonetheless result.

Figure 2:
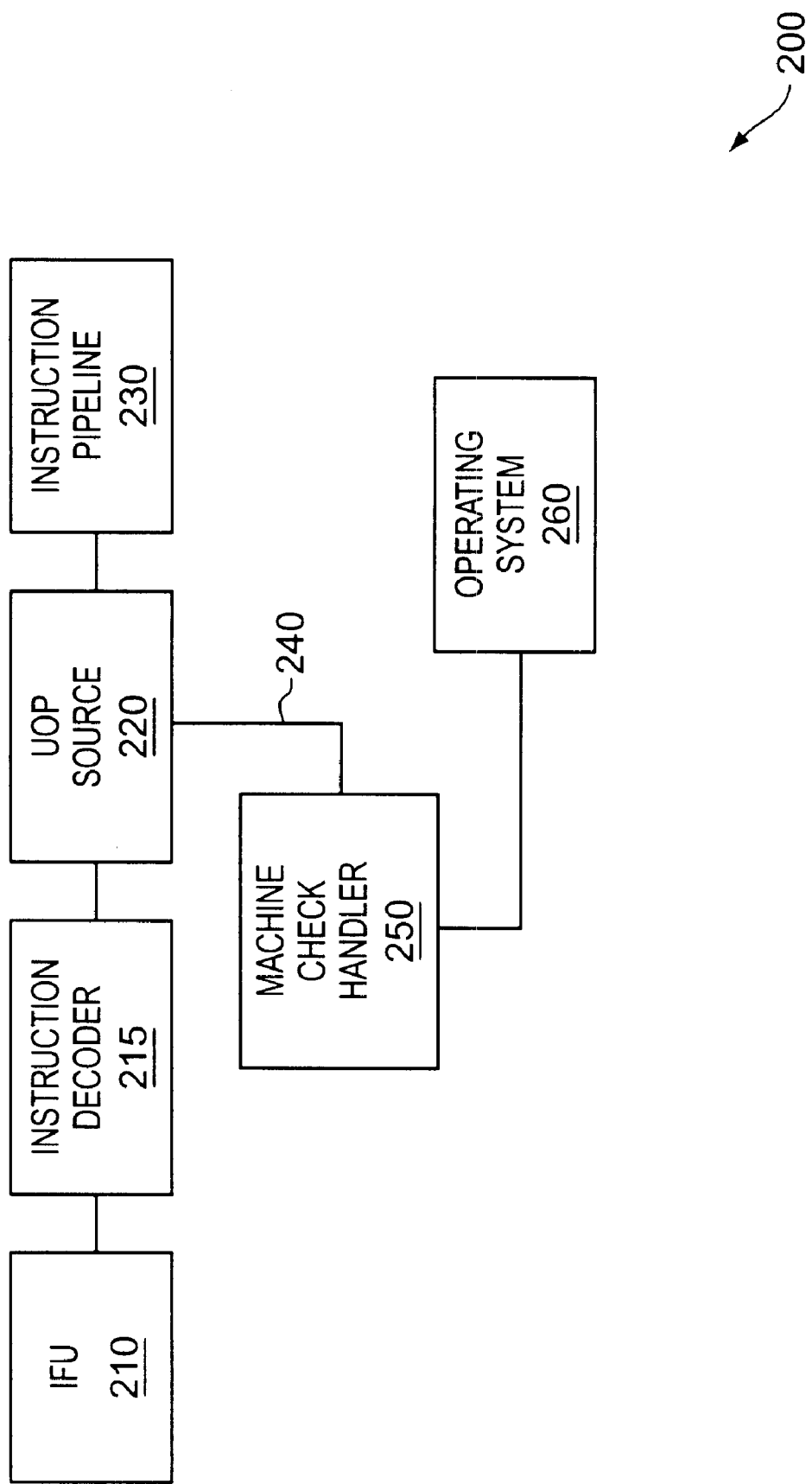
FIG. 2 is a block diagram illustrating a prior art embodiment for handling corrupted microcode instructions.

FIG. 2 is a block diagram illustrating a prior art embodiment 200 for reducing the undesired effects of corrupted uops in a processor instruction pipeline. Block 210 comprises an instruction fetch unit (IFU). As is well-known, instruction fetch units, such as block 210, for example, are sources of program instructions, or macro-instructions, for processor instruction pipelines, such as in embodiment 200. Macro-instructions are high level instructions that typically cannot be directly executed by a processor. Block 215 comprises an instruction decoder, which decodes or converts these high level macro-instructions into executable instructions, or uops for this particular embodiment. These instructions may be obtained by block 210 from main memory (not shown) or from a cache containing macro-instructions (also not shown). These uops may then be stored, or cached, in the uop source of block 220. This caching allows subsequent access of these uops without the latency of block 210 fetching and block 215 decoding macro-instructions. As is well-known, uop sources, such as block 220, are typically implemented as read-only-memory (ROM) or static random access memory (SRAM). As is also well-known, ROM cannot be used for caching uops.

In this particular embodiment, uop source 220 may be implemented as an instruction cache or a trace cache. An instruction cache comprises a cache that is employed to contain only instruction information, thereby typically reducing or removing the latency associated with fetching and decoding an instruction. Similarly, trace caches are typically employed to contain only instruction information. Additionally, trace caches typically have specific architectural features that will typically reduce latency further. These approaches are well-known in the art and will not be discussed in detail expect as it relates to the present invention or an embodiment thereof. For example, trace caches are discussed in the article "Trace Cache: a Low Latency Approach to High Bandwidth Instruction Fetching," by E. Rotenburg, S. Bennett, and J. E. Smith, available from the IEEE and published in the Proceedings of the $29^{th}$ Annual International Symposium on Microarchitecture, Dec. 2–4, 1996, Paris, France, although, of course, the invention is not limited in scope to employing the trace cache discussed in that article or even to employing a trace cache at all. Likewise, trace caches are discussed in U.S. patent application Ser. No. 08/956,375, entitled "Trace Based Instruction Caching," by Chan E. Lee, filed on Oct. 23, 1997, and assigned to the assignee of the present invention. Again, the invention is not limited in scope to the trace cache approach described therein.

Most caches or cache arrays, including instruction caches and trace caches, comprise SRAM. As is well-known, SRAM, because of its typical design features, is susceptible to common sources of soft errors. As previously discussed, soft errors are typically the result of external random events. These external random events may result in a digital logic value switching from its intended value to the opposite logic value, e.g., from logic '1' to logic '0'. As is also well-known, soft errors are transient in nature. More particularly, after the effects of a soft error are corrected, digital electronic components will typically function as expected. One example of a source of soft errors, though the invention is not limited in scope in this respect, is highly energetic sub-atomic particles that impinge on the processor. This interaction may create electrical charge that may alter an intended value of an SRAM storage element, e.g., change a logic '1' to a logic '0'. If this change in logic level were to occur in a uop, this may result in that uop being corrupted.

Referring again to FIG. 2, in embodiment 200, when a uop for a processor operation is present in uop source 220, that uop may be read by block 220 and dispatched to instruction pipeline 230. A corrupted uop may, therefore be read for dispatch into instruction pipeline 230. In this particular embodiment, as is typically done, uop source 220 performs a parity calculation when the uop is read. Parity calculation methods are well-known by those skilled in the art and the invention is not limited in scope to any particular parity calculation method. The parity calculation is then compared with the expected parity. If a parity error is detected, that is if the calculated parity does not match the expected parity, here, a signal is asserted on coupling 240. When a signal on coupling 240 is asserted, this provides machine check handler 250 with an asynchronous indication that a corrupted uop has been placed in the instruction pipeline. In this particular embodiment, machine check handler 250 comprises a central unit for communicating various processor error states to an operating system, such as operating system 260 in embodiment 200. Additionally, the indication of a parity error from uop source 220 is asynchronous because the time it takes to determine and compare parity is typically longer than the time it takes to dispatch uops to instruction pipeline 230. This asynchronous relation is one reason it may be difficult to invalidate a corrupted uop.

In this particular embodiment, machine check handler 250 signals operating system 260 when a parity error has occurred and the system employing the processor is typically halted then restarted. One disadvantage of this embodiment is that the system is restarted to address or remove the effects of a corrupted uop. However, as previously discussed, halting a system and restarting it may result in lost data and is also inefficient.

Another disadvantage of this embodiment is more clearly illustrated by processors that have speculative and non-speculative instruction paths, such as uprocessors. This disadvantage is that a corrupted uop merely being dispatched may result in the system halting. If the corrupted uop were part of an instruction path that is ultimately not processed, as may occur in some uprocessor architectures, halting and restarting a system in which this particular embodiment is employed would not be necessary. As is well known in the art, committing state for a uop indicates that the uop successfully executed and was on a non-speculative path. Therefore, halting a system due to a corrupted uop for which state will not be committed is an inefficient use of the system.

Figure 1:
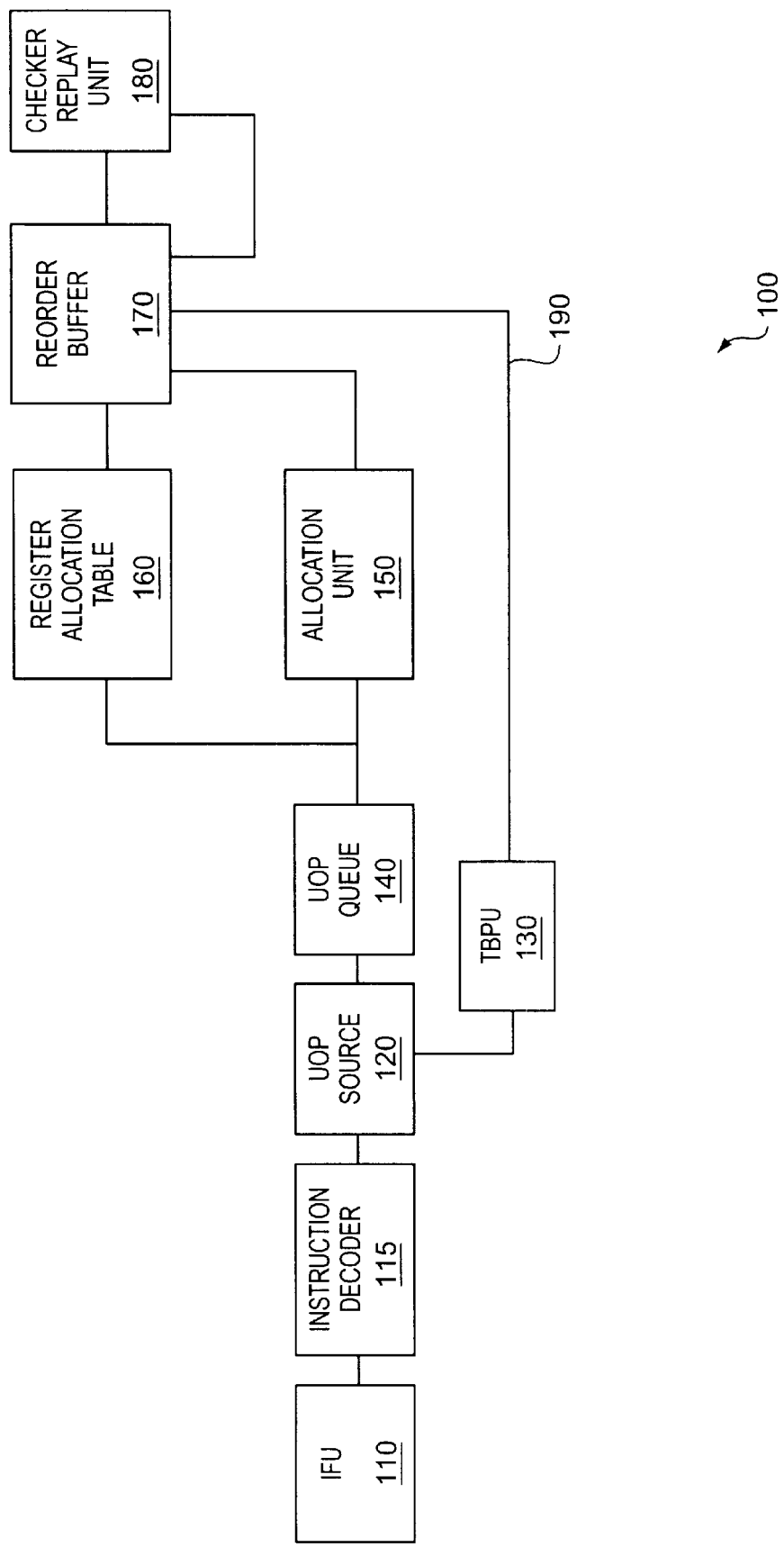
FIG. 1 is a block diagram illustrating one embodiment of a processor instruction pipeline in accordance with the invention.

Although the invention is not limited in scope to the embodiment illustrated in FIG. 1, embodiment 100, as one example, addresses the disadvantages previously described. IFU 110 and Instruction Decoder 115 work in a substantially similar manner as previously described. In this embodiment, the uop source 120 also may function in a substantially similar manner as previously described. When one or more uops are read from uop source 120 in this particular embodiment, parity for those uops is calculated. Uop source 120 then compares the calculated parity to the expected parity. If the calculated parity and expected parity are different, this indicates that a corrupted uop has been placed in the instruction pipeline of embodiment 100. Uop source 120 then logs this occurrence of a corrupted uop in a status register (not shown) and also communicates the occurrence of a corrupted uop to trace branch prediction unit (TBPU) 130. Here, TBPU 130 controls branch prediction and uop sequencing for uop source 120. TBPU 130 also includes retirement information that it communicates to other instruction pipeline units. In this particular embodiment 100, allocation unit 150 schedules uops for execution. Allocation unit 150 assigns resources and a sequence number to a uop as it is scheduled in this embodiment. For this embodiment, TBPU 130 will associate the parity error with the first uop that is scheduled and marked as a beginning-of-macro-instruction (BOM) in instruction pipeline 100. This may comprise a macro-instruction that includes the corrupted uop or a macro-instruction issued prior to that macro-instruction. As previously described, macro-instructions may be decoded into uop sequences or other microcode instructions. TBPU 130 then communicates to the Reorder Buffer (ROB) 170 on coupling 190 that the corruption of one or more uops has occurred. One function of ROB 170 is to retire uops when they have completed execution and then commit processor state for those uops that have successfully executed. Uops may be executed out of order in this particular embodiment. ROB 170 reorders uops in their program flow order after execution is complete. In this particular embodiment, uops that reach retirement and are tagged as corrupted will not have state committed, but, instead, will result in instruction pipeline 100 being flushed, as is discussed in more detail hereinafter.

Embodiment 100 addresses the previously described disadvantages without having to slow the progression of uops in instruction pipeline 100. As the processing time for uops is reduced, the ability to signal the occurrence of a corrupted uop before state is commited becomes more difficult. For this particular embodiment, the uop latency boundary condition occurs when there are no uops present in uop queue 140. More specifically, when uop queue 140 contains no uops, latency is less than when 140 contains uops. Uop queue 140 is capable of storing uops in the order of dispatch from uop source 120 until Allocation Unit 150 schedules them for execution. Although the invention is not limited in scope in this respect, embodiment 100 addresses the uop latency boundary condition, where there are no uops queued in block 140, as well as the condition where uops are queued in block 140.

In this particular embodiment, the uop latency boundary condition for detecting corrupted uops in instruction pipeline 100, e.g., when uop queue 140 is empty, results in lower uop latency. This lower uop latency makes corrupted uop invalidation more difficult. In this particular situation, the first uop that is marked BOM may be the first in the instruction pipeline to be scheduled after a corrupted uop is detected by uop source 120. TBPU 130 will associate the error with this uop and if the tagged uop attempts to retire, instruction pipeline 100 will be flushed. Therefore, the uop latency boundary condition is addressed by embodiment 100 in accordance with the invention.

Alternatively for this embodiment, the case where uops are lined up in uop queue 140 will result in longer uop latency. In this specific situation, a uop marked BOM may exist in uop queue 140 in front of the macro-instruction set of uops that contain the actual corrupted uop. Therefore, this earlier uop marked BOM may be specifically tagged by TBPU 130 with the indication that a corrupted uop has been detected. This outcome for embodiment 100 is acceptable, as the error indication will be in front of the actual corrupted uop in uop queue 140. When ROB 170 places uops back in their program flow order, the uop marked with the error indication will attempt to retire before the actual corrupted uop. The tagged uop attempting to retire results in an instruction pipeline flush. Therefore, signaling the error to not commit state for the corrupted uop is accomplished as it will be removed by this instruction pipeline flush.

ROB 170, as previously described, determines whether a uop has completed execution. If a uop completes execution normally, ROB 170 retires this uop and commits state in the processor for that operation. If a uop is not ready for retirement, ROB 170 passes the uop to Checker Replay Unit 180 (CRU). In this particular embodiment, CRU 180 is the control logic for ROB 170 and also determines when uops are ready for retirement. CRU 180 attempts to reschedule the uop for execution with the appropriate data for the uop and then CRU 180 returns the uop to the ROB to determine if the uop is now ready for retirement. The interaction of ROB 170 and CRU 180 in this particular embodiment may be referred to as replay.

Replay may occur multiple times for a uop in embodiment 100. In this particular embodiment 100, ROB 170 will not flush instruction pipeline 100, discussed in more detail hereinafter, unless ROB 170 attempts to retire a uop marked as corrupted. Therefore, for this embodiment, if ROB 170 does not attempt to retire the uop that is marked as corrupted, instruction pipeline 100 will not be flushed. This provides an efficiency advantage because a flush of the pipeline does not occur unless there is an attempt to retire the uop marked as corrupted. As indicated, approaches exist where a flush occurs regardless of whether there would ever be an attempt to retire the corrupted uop.

As one specific example of this approach, ROB 170 will not attempt to retire corrupted uops if they are dispatched after other corrupted uops. In this particular situation, the ROB attempting to retire the first corrupted uop would result in subsequent corrupted uops being cleared by the instruction pipeline flush. If, however, instead, there is no attempt to retire the first uop, then the entire sequence will never be executed or reach retirement, and, therefore, be invalid, including the corrupted uops that were dispatched after other corrupted uops.

One other example where a uop marked as corrupted will not retire is if the marked uop is after a uop that contains a conditional branch to another execution path. In this case, the path that the corrupted uop is on would not attempt to retire, because the marked uop, along with other uops on the same path, will never be executed or reach retirement in this particular embodiment. Therefore, these uops would be cleared from instruction pipeline 100 without ROB 170 attempting to retire them.

However, if the uop marked as corrupted remains on a valid path of uops and ROB 170 attempts to retire the marked uop, ROB 170 will not actually retire and commit state in the processor for the corrupted uop. ROB 170 will, instead, signal to the processor that a corrupted uop has reached retirement. This signal initiates a protocol in the processor that is not described in detail here. Briefly, however, this protocol results in the processor discarding most of the uops that are being processed and preparing to receive replacement uops. Part of this protocol is that the processor is signaled where to starting obtaining uops to handle the event. In this particular embodiment, the processor is signaled to execute a uop flow that flushes uop source 120 and restarts the processor at the macro-instruction containing the uop that was marked as being corrupted.

Figure 4:
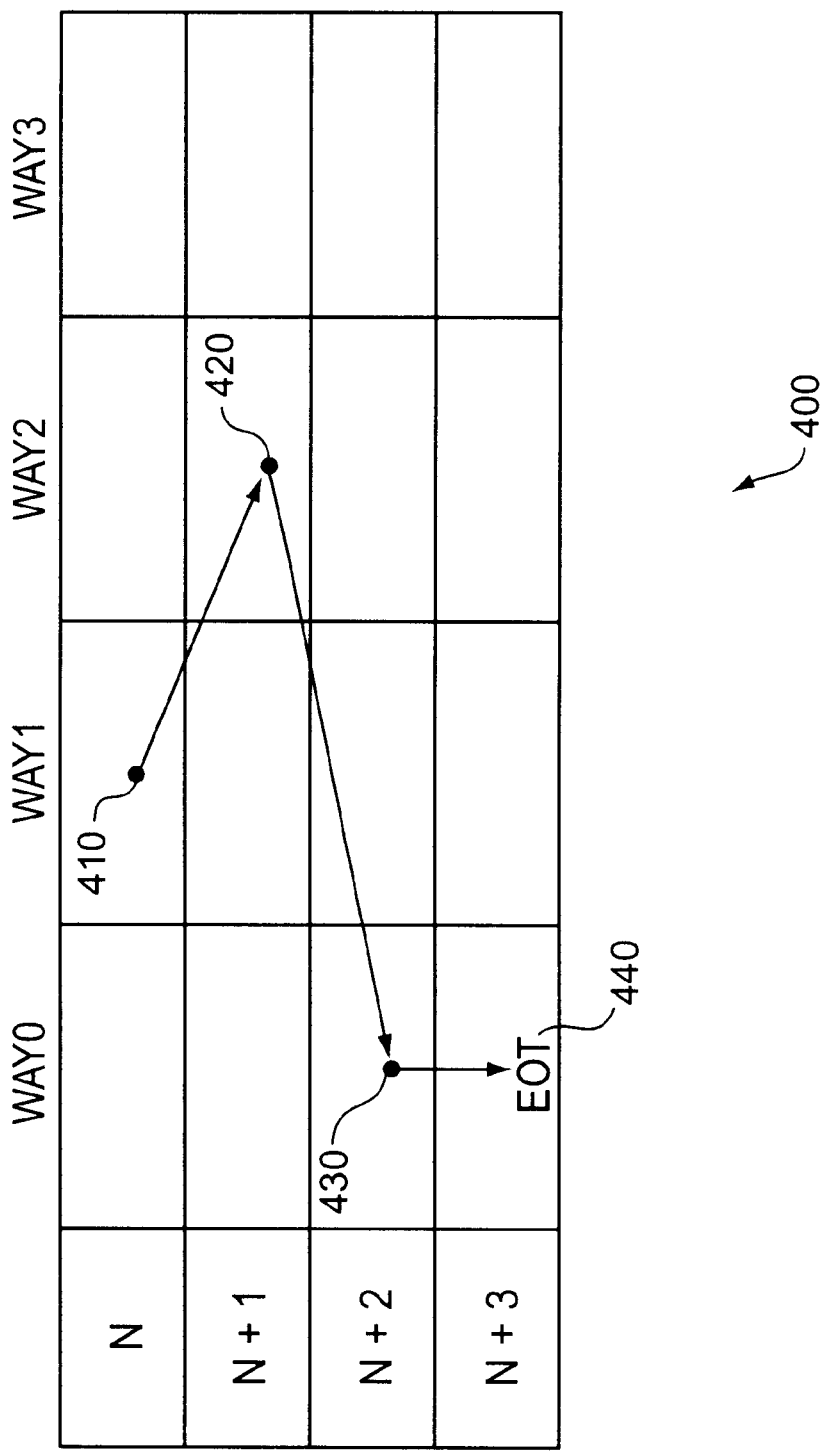
FIG. 4 is a diagram illustrating a table showing the indexing organization of a trace cache, where such trace cache may be employed in an embodiment of a processor instruction pipeline in accordance with the invention.

When embodiment 100 is implemented using a trace cache architecture as uop source 120, the benefits of such embodiments in accordance with the present invention may be more significant, although the invention is not limited in scope in this respect. Trace caches, as well as instruction caches, were previously discussed. FIG. 4 is a table that illustrates the indexing structure for one embodiment of a trace cache. Cache architectures with sets and ways are well known in the art, however, a trace cache comprises a special architecture designed to be a low latency source of uops for processor instruction pipelines, such as embodiment 100.

Referring now to FIG. 4, in this diagram the head of a trace or series of uops is indicated by trace cache entry 410.

As is well-known, a trace may only be entered through a head, in this context, the first uop or microcode instruction in a macro-instruction. Each entry table 400, with the exception of head 410, is stored in successive sets but the way may vary for each entry in table 400. In this particular embodiment, the trace cache is implemented using a set associative cache architecture, which is well-known by those skilled in the art. The trace head is tagged with a linear address, which determines its set. Each entry in table 400, with the exception of the tail 440, contains a way pointer to the next set. In table 400, for example, entry 410 contains a way pointer to entry 420. In turn, entry 420 contains a way pointer to entry 430. Finally, in this particular example, block 430 contains a way pointer to the tail of the trace entry 440. Additionally, in table 400, tail 440 and entries 420 and 430 contain way pointers to their previous entries.

Those skilled in the art will understand that the approach illustrated in table 400 enables uops to be provided with low latency. This low latency results from the indexing structure illustrated in table 400. Use of a trace cache, such as the one illustrated by table 400 for uop source 120 of embodiment 100, may further decrease the time available for determining that a corrupted uop has been placed in the pipeline. One advantage of embodiment 100 of the invention is that it is capable of indicating the presence of a corrupted uop when a trace cache is employed as uop source 120 in this embodiment, e.g., where uops are provided with relatively low latency. Of course, the foregoing does not limit the scope of the invention in any respect.

FIG. 5 is a flowchart illustrating an embodiment of a method for executing uops in accordance with the invention. In this particular embodiment, flowchart 500 illustrates a case where no uops are queued waiting to be scheduled, as in block 545. Flowchart 500, therefore, illustrates a particular situation. For this embodiment, block 505 reads uops from a uop source. Block 540 dispatches uops to an instruction pipeline. Block 545 then schedules uops and uops subsequently arrive at a ROB as illustrated by block 550. In parallel with uop dispatch of block 540, block 510 calculates parity for uops that are dispatched. Block 515 compares the calculated parity with the expected parity. Block 520 determines if the calculated and expected parity match. If the values match in block 520, there is no error and no further action is taken on this path as illustrated by block 525. The uop then will continue to execute without being tagged as being corrupted. (not shown)

If block 520 determines that a parity error does exist, a TBPU, such as the previously described embodiment, is signaled that a corrupted uop has been dispatched by block 540. Block 535 then writes the indication of the error into the ROB and the corrupted uop is tagged as corrupted in block 550. Block 555 then determines if the corrupted uop is attempting to retire. If the uop is not attempting to retire the uop is replayed, as was previously discussed, by block 555 back to block 550. If block 555 determines a tagged uop is attempting to retire, block 560 will cause a flush of the instruction pipeline, as was previously described. Block 565 then clears the instruction pipe of the current uop trace. Finally, block 570 restarts operation at the corrupted uop. Again, FIG. 5 illustrates a flowchart for one particular embodiment of a method in accordance with the invention and, of course, the invention is not limited in scope in this respect.

Figure 3:
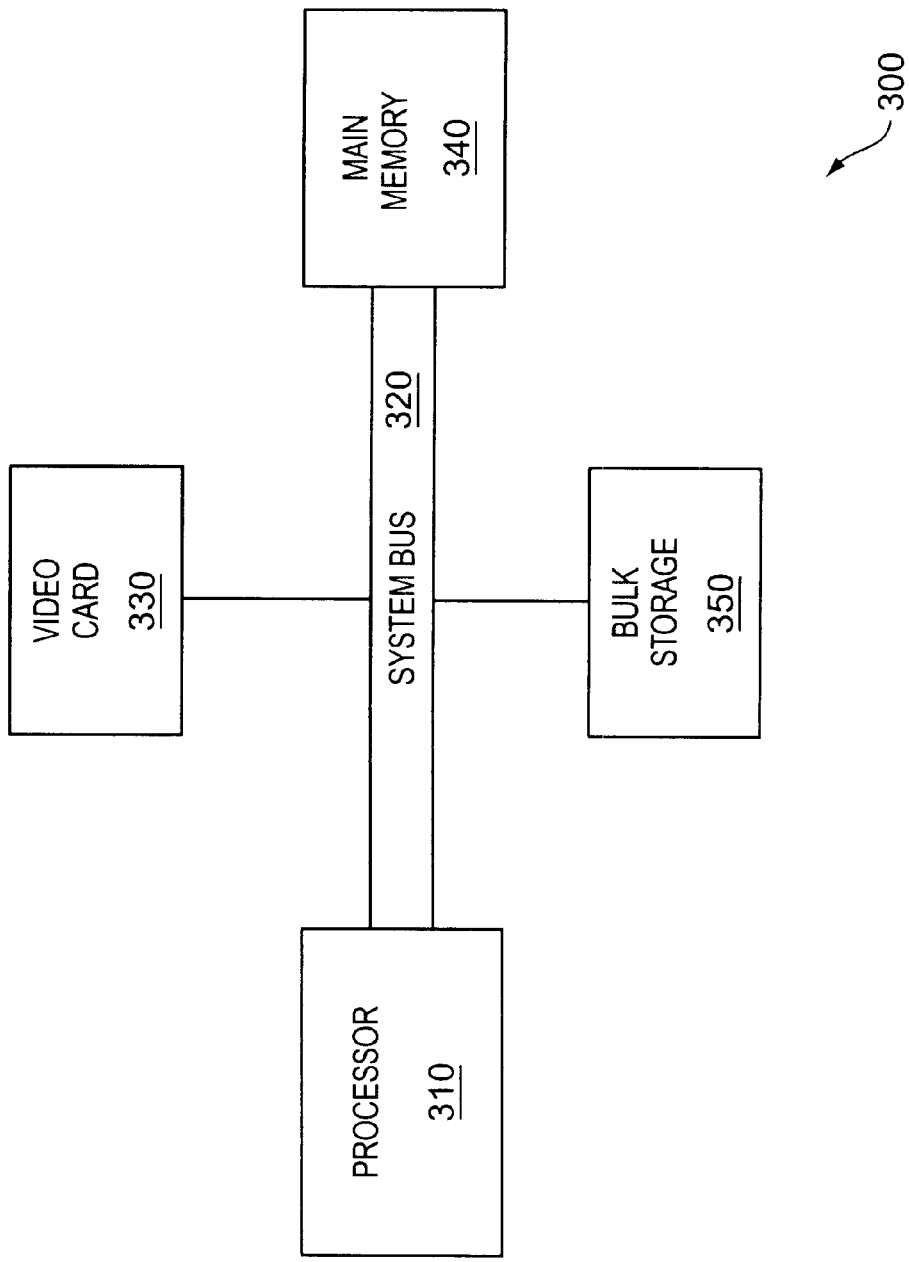
FIG. 3 is a block diagram illustrating an embodiment of a system in accordance with the invention, including a processor capable of detecting corrupted microcode instructions.

An additional embodiment is illustrated in FIG. 3. Embodiment 300, for example, illustrates a system containing a processor 310 with a micro-operation (uop) source capable of detecting the occurrence of one or more corrupted uops and signaling to at least one other instruction pipeline unit, the occurrence of a corrupted uop. In this particular embodiment, processor 310 is coupled to system bus 320. System bus 320 is, in turn, coupled to main memory 330, video card 340, and bulk storage 350. In this particular embodiment, main memory 330 may be implemented, for example, as synchronous dynamic random access memory (SDRAM) or rambus DRAM (RDRAM). Additionally, in this particular embodiment, video card 340 is employed for video signal processing. Finally, some examples of devices that may be employed for bulk storage 350 for this particular embodiment comprise a hard disk drive, compact disk drive and digital video disk drive. Of course, the foregoing discussion of FIG. 3 does not limit the scope of the invention in any respect.

Many alternative embodiments in accordance with the invention are possible, and the invention is not restricted in scope to any particular embodiment. For example, embodiments may include a processor pipeline that may include a uop source, the capability to detect corruption of uops dispatched from this uop source, and the additional capability to signal another pipeline unit that a corrupted uop is present. Likewise, embodiments may include a method for executing instructions, that, when executed by a system, such as a personal computer, for example, results in, for example, the operation previously described, although the invention is not limited in scope in this respect.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A processor comprising an instruction pipeline including a plurality of instruction pipeline units, a first one of said units being capable of detecting a corrupted microcode instruction and signaling to at least a second one of said units the occurrence of said corrupted microcode instruction, said second one of said units being capable of determining whether said corrupted microcode instruction has completed execution and flushing said instruction pipeline of said corrupted microcode instruction if said corrupted microcode instruction has completed execution.

2. The processor of claim 1, wherein said first one of said units comprises a micro-operation source.

3. The processor of claim 1, wherein said first one of said units comprises a decoded reduced instruction set computer (RISC) instruction source.

4. The processor of claim 1, wherein said second one of said units comprises an instruction pipeline unit downstream in said instruction pipeline from said first one of said units.

5. The processor of claim 4, wherein said instruction pipeline is capable of processing a macro-instruction, said first one of said units including the capability to signal to at least one other instruction pipeline unit in said instruction pipeline the occurrence of said corrupted microcode instruction within in said macro-instruction so that said instruction pipeline is flushed of said macro-instruction upon completion of said corrupted microcode instruction.

6. The processor of claim 4, wherein said second one of said units is adapted to signal the occurrence of said corrupted microcode instruction to a reorder buffer capable of retiring microcode instructions and committing processor state.

7. The processor of claim 4, wherein said first one of said units comprises a read only memory (ROM).

8. The processor of claim 4, wherein said first one of said units comprises an instruction cache.

9. The processor of claim 6, wherein said second one of said units is capable of associating the occurrence of said corrupted microcode instruction with a microcode instruction which represents the beginning of a macro-instruction that includes said corrupted microcode instruction and wherein flushing said instruction pipeline includes flushing said macro-instruction.

10. The processor of claim 6, wherein said processor includes a trace branch prediction unit, one of said instruction pipeline units comprising said reorder buffer, said first one of said units including the capability to signal the presence of said corrupted microcode instruction to said trace branch prediction unit so that said trace branch prediction unit signals said reorder buffer to initiate a flush of the trace of said corrupted microcode instruction from said instruction pipeline if said reorder buffer attempts to retire said corrupted microcode instruction.

11. The processor of claim 11, wherein said trace branch prediction unit has the capability to associate the occurrence of said corrupted microcode instruction with a first microcode instruction in a macro-instruction and wherein said trace of said corrupted microcode instruction comprises all microcode instructions of said macro-instruction.

12. The method of claim 1, wherein said second one of said units comprises a trace branch prediction unit and said first one of said units comprises a microcode source.

13. The processor of claim 1, wherein the second one of said units is further capable of replaying said corrupted microcode instruction if said corrupted microcode instruction has not completed execution.

14. The processor of claim 1, wherein the corrupted microcode instruction is corrupted by a soft error.

15. A method of executing microcode instructions comprising:
    detecting the existence of a corrupted microcode instruction in a processor instruction pipeline;
    determining whether said corrupted microcode instruction has completed execution; and
    flushing said instruction pipeline of said corrupted microcode instruction if said corrupted microcode instruction has completed execution.

16. The method of claim 15, further comprising signaling the occurrence of said corrupted microcode instruction by signaling the occurrence of said corrupted microcode instruction asynchronously with dispatching instructions into said processor instruction pipeline.

17. The method of claim 16, wherein said signaling initiates a flush of said processor instruction pipeline.

18. The method of claim 15 further comprising restarting operation at said corrupted microcode instruction if said corrupted microcode instruction is flushed.

19. The method of claim 15, further comprising tagging said corrupted microcode instruction as corrupted in a reorder buffer of said instruction pipeline.

20. The method of claim 19, wherein tagging said corrupted microcode instruction comprises tagging the first microcode instruction that is marked as a beginning-of-macro-instruction and that is scheduled in said instruction pipeline and wherein flushing said instruction pipeline comprises flushing said instruction pipeline of all microcode instructions of said macro-instruction.

21. The method of claim 19, wherein determining whether said corrupted microcode instruction has completed execution comprises determining whether said corrupted microcode instruction is attempting to retire.

22. The method of claim 15, further comprising replaying said corrupted microcode instruction if said corrupted microcode instruction has not completed execution.

23. The method of claim 15, wherein a trace branch prediction unit associates said corrupted microcode instruction with a first microcode instruction in a macro-instruction and wherein flushing said instruction pipeline of said corrupted microcode instruction comprises flushing said instruction pipeline of all microcode instructions of said macro-instruction.

24. The method of claim 15, wherein the corrupted microcode instruction is corrupted by a soft error.

25. A system comprising:
    a processor including an instruction pipeline including a plurality of instruction pipeline units, one of said units comprising a microcode source, said microcode source being capable of detecting a corrupted microcode instruction and signaling to at least one other instruction pipeline unit in said instruction pipeline the occurrence of said corrupted microcode instruction, said at least one other instruction pipeline unit being capable of determining whether said corrupted microcode instruction has completed execution and flushing said instruction pipeline of said corrupted microcode instruction if said corrupted microcode instruction has completed execution;
    a system bus; and
    a main memory.

26. The system of claim 25, further comprising a video card, and at least one bulk storage device coupled to said system bus.

27. The system of claim 25, wherein said main memory comprises rambus DRAM (RDRAM).

28. The system of claim 25, wherein said main memory comprises synchronous DRAM (SDRAM).

* * * * *